United States Patent [19]

Klingbiel

[11] Patent Number: 4,860,145
[45] Date of Patent: Aug. 22, 1989

[54] TAP SWITCHING PROTECTION CIRCUIT

[75] Inventor: August G. Klingbiel, Addison, Ill.

[73] Assignee: Oneac Corporation, Libertyville, Ill.

[21] Appl. No.: 786,368

[22] Filed: Oct. 11, 1985

Related U.S. Application Data

[63] Continuation of Ser. No. 551,357, Nov. 14, 1983, abandoned.

[51] Int. Cl.$^4$ ............................................. H02H 7/00
[52] U.S. Cl. ..................................... 361/18; 323/257; 323/258
[58] Field of Search .................. 361/18; 323/255, 257, 323/258, 259, 340, 343, 256, 305, 310

[56] References Cited

U.S. PATENT DOCUMENTS

| | | | |
|---|---|---|---|
| 2,112,064 | 3/1938 | Blume | 323/256 |
| 3,263,157 | 7/1966 | Klein | 323/255 |
| 3,308,374 | 3/1967 | Kagawa | 323/343 |
| 3,422,338 | 1/1969 | Philipps | 363/48 |
| 3,524,990 | 8/1970 | Bajpai et al. | 363/50 X |
| 3,530,369 | 9/1970 | Thompson | 323/258 |
| 3,699,358 | 10/1972 | Wilkinson | 323/272 X |
| 3,706,024 | 12/1972 | Wood | 323/258 |

FOREIGN PATENT DOCUMENTS 108121  6/1984  Japan ................................... 323/257

*Primary Examiner*—A. D. Pellinen
*Assistant Examiner*—H. L. Williams
*Attorney, Agent, or Firm*—Mason, Kolehmainen, Rathburn & Wyss

[57] ABSTRACT

A protection circuit is provided for a tap switching line voltage regulator of the type which selectively switches in one of a predetermined number of taps on a winding of a transformer. The selective switching of the taps is controlled in response to the sensed load voltage to provide a regulated voltage to a load in the presence of a varying input line voltage. The tap switching line voltage regulator in response to the sensed load voltage controls the conductive state of a solid state series switching element in each of the switched tap lines. The protection circuit provides current limiting inductors in series with each of the solid state switching elements with all the inductors being wound on a common magnetic core. When switching from one tap to another tap, the tap switching line volage regulator in response to the sensed voltage operates to select an adjacent tap to the tap currently selected. Thus, tap switching proceeds in a sequential fashion up and down along the taps. The series inductors are wound on the common magnetic core such that the direction of the windings alternates between adjacent taps. Accordingly, the protection circuit provides a current limiting impedance to circulating currents that is four times the impedance to normal load currents. Accordingly, the circulating current caused by leading or lagging power factor operation is limited to prevent damage to the solid state switching elements.

9 Claims, 4 Drawing Sheets

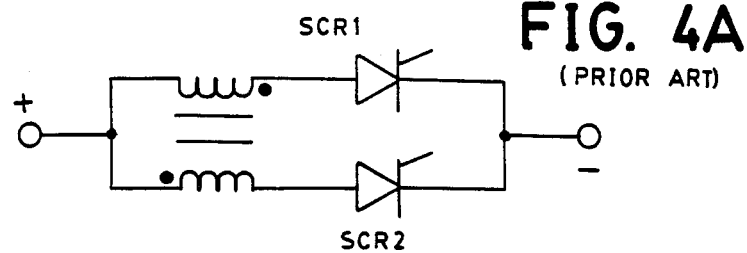
FIG. 4A
(PRIOR ART)
FIG. 4B
(PRIOR ART)
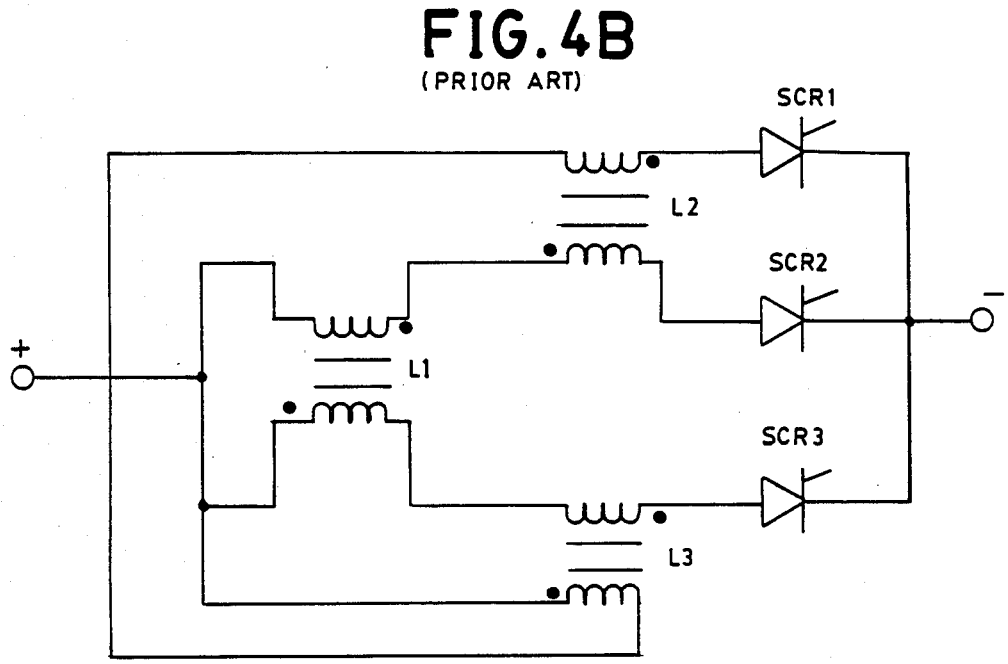
FIG. 4C
(PRIOR ART)
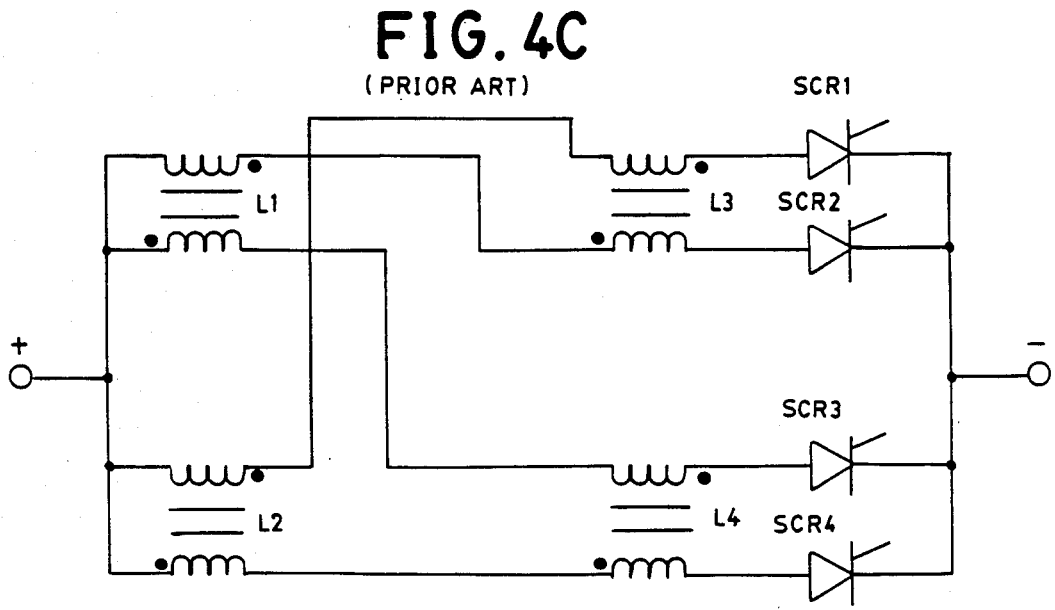

TAP SWITCHING PROTECTION CIRCUIT

This application is a continuation of application Ser. No. 551,357 filed Nov. 14, 1983, now abandoned.

BACKGROUND OF THE INVENTION

1. Field of the Invention

The present invention relates generally to switching circuits and voltage regulators and more particularly to a protection circuit for a tap switching line voltage regulator.

2. Background of the Invention

In the past thyristors have been used as the series switching element in tap switching regulators on each of the taps to be switched. The thyristor device in accordance with the appropriate control circuitry may be triggered "on" anytime the anode voltage is more positive than the cathode and will remain in the conducting state without a control signal being applied until the current through the device is reduced to less than a very small value referred to as the "holding current". Then the device will turn off until the voltage applied to the anode is positive with respect to the cathode and another trigger pulse is applied to the control gate.

The incoming power line sine-wave voltage reduces the current in the "on" device to zero once each half cycle. The control circuitry must apply a trigger pulse to the correct thyristor device once each half cycle so that the load has a continuous source of voltage.

If the load is resistive then the voltage and current will be in phase. The typical regulator control circuit will trigger the thyristors at either zero line voltage or zero line current which is suitable for resistive type loads. The real load will be either lagging power factor (inductive) or leading power factor (capacitive). The net result is either a switching transient the load, a loss of part of a half cycle of voltage, or a large circulating current between taps when two thyristor series switching devices are on at one time as with leading power factors; i.e. the next device is turned "on" while current is still flowing in the last device. The large circulating currents of the latter case may damage the thyristor switching devices while the first two cases may disturb the load.

Magnetic type components have been used in the past to force semiconductor devices to share load current when one device is not large enough to carry the total load current as shown in FIG. 4A. Multiple numbers of devices can be accommodated with increasing complexity, cost and the number of magnetic components as shown in FIGS. 4B and 4C. This arrangement works only for common input, common output load current sharing configurations; (reference General Electric SCR Manual Sixth Edition 176-177).

SUMMARY OF THE INVENTION

It is a principal object of the present invention to provide a protection circuit for a tap switching line voltage regulator to protect the series switching element in each tap from excessive circulating currents and to allow appropriate switching control between taps to provide a suitable and continuous supply to a load.

It is another object of the present invention to provide a current limiting inductor in series with each solid state switching element of a tap switching line voltage regulator with the inductors being wound on a common core and in an appropriate direction or winding sense and with the sequencing control of the tap switches to increase the impedance to circulating currents to four times the impedance to normal load currents.

It is another object of the present invention to provide switching element device protection in a tap switching line voltage regulator with minimal effects to normal operating performance.

It is another object of the present invention to provide a tap switching line voltage regulator that provides continuous voltage to a load with any power factor from 0.3 leading to 0.3 lagging during the changing or switching between taps.

It is another object of the present invention to provide a tap switching line voltage regulator with transient free switching from one tap voltage to another tap voltage.

Briefly, these and other objects of the present invention are achieved by providing a protection circuit for a tap switching line voltage regulator of the type which selectively switches in one of a predetermined number of taps on a winding of a transformer. The selective switching of the taps is controlled in response to the sensed load voltage to provide a regulated voltage to a load in the presence of a varying input line voltage. The tap switching line voltage regulator in response to the sensed load voltage controls the conductive state of a solid state series switching element in each of the switched tap lines. The protection circuit provides current limiting inductors in series with each of the solid state switching elements with all the inductors being wound on a common magnetic core. When switching from one tap to another tap, the tap switching line voltage regulator in response to the sensed voltage operates to select an adjacent tap to the tap currently selected. Thus, tap switching proceeds in a sequential fashion up and down along the taps. The series inductors are wound on the common magnetic core and connected in circuit such that the direction of the windings alternates between adjacent taps. Accordingly, the protection circuit provides a current limiting impedance to circulating currents that is four times the impedance to normal load currents. Accordingly, the circulating current caused by leading or lagging power factor operation is limited to prevent damage to the solid state switching elements.

BRIEF DESCRIPTION OF THE DRAWING

These and other objects and advantages of the present invention will become more apparent by reference to the following description taken in conjunction with the accompanying drawing wherein:

FIG. 4 illustrates current sharing techniques of the prior art with various numbers of parallel devices.

DESCRIPTION OF THE PREFERRED EMBODIMENT

Figure 1:
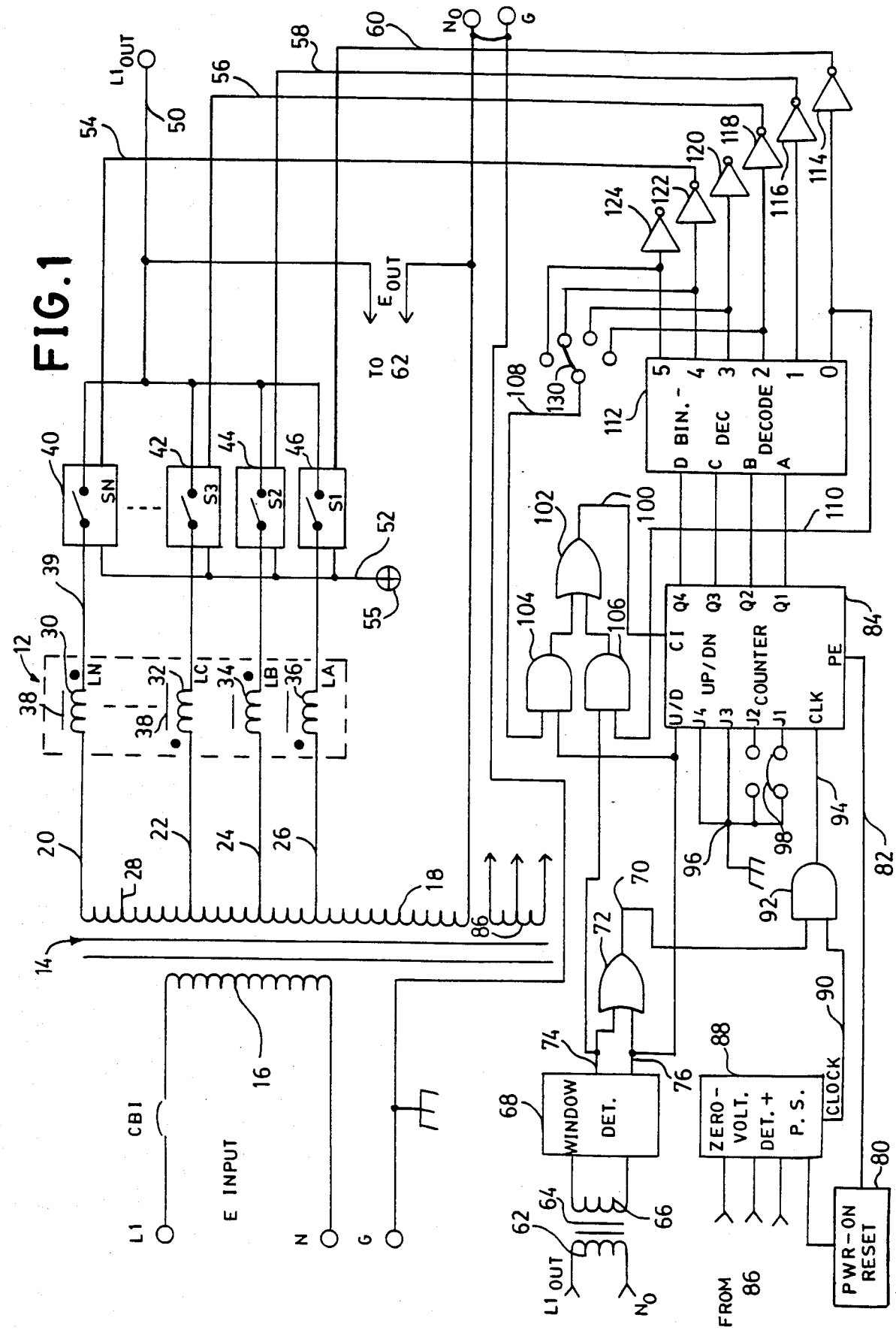
FIG. 1 is an electrical schematic and block diagram illustrating a first embodiment of a tap switching line voltage regulator in accordance with the protection circuit of the present invention.

Referring to the drawing wherein like reference characters refer to like elements throughout, there is illustrated in FIG. 1 a tap switching line voltage regulator 10 including a protection circuit 12 in accordance with the principles of the present invention. The tap switching line voltage regulator 10 includes a transformer 14 having a primary winding 16 connected across the live and neutral lines L1 and N respectively of a single phase power input source. The live line L1 includes a conventional breaker CB1 for normal circuit protection.

The transformer 14 also includes a multiple tapped secondary winding 18. One end of the secondary 18 is connected to the neutral output lead $N_{out}$ and in a preferred arrangement the neutral output lead is connected to the safety ground lead G shown connected to earth ground. The other end 20 of the secondary winding 18 is the full tap output of the transformer 14. The secondary winding 18 includes the plurality of tapped secondary lines illustrated for example at 20, 22, 24, and 26.

The protection circuit 12 of the present invention includes a current limiting inductor connected in series with each of the secondary tap lines. For example as illustrated in FIG. 1, the protection circuit 12 includes an inductor 30 connected at one end to the full secondary output 20 and inductors 32, 34 and 36 connected respectively to the secondary tap lines 22, 24, and 26. Each of the inductors 30, 32, 34 and 36 are provided as respective windings on a common magnetic core 38 with winding directions as indicated in FIG. 1 as will be explained in more detail hereinafter.

The secondary output 20 is connected through the series combination of an inductor 30 and a solid state switch device 40 to the output 50 designated $L1_{out}$. Similarly each of the tapped secondary lines 22, 24 and 26 are connected through the series combination of a respective inductor 32, 34, 36 and respective solid state switch devices 42, 44, 46 to the output 50. Each of the solid state switching devices 40, 42, 44, and 46 includes a first common control input 52 connected to a suitable supply voltage 55. Further each of the solid state switching devices 40, 42, 44 and 46 includes a respective second control input 54, 56, 58 and 60.

While four solid state switching devices and four respective inductors are illustrated in FIG. 1 corresponding to four secondary tap lines, it should be realized that any predetermined number of solid state switching devices and corresponding inductors can be provided in various embodiments equal to the number of desired secondary taps.

Each of the solid state switching devices, for example solid state switch 40 is selectively arranged to provide a conduction path so as to connect the line 20 to the line 50 through the inductor 30 and the solid state switch 40 with appropriate voltage and current conditions at the control lines 52 and 54 for switch 40. For example, with a positive supply voltage 55 and a current sinking connection at 54, such as provided by a low logic level output condition of a logic gate, the conduction path of the solid state switching device 40 is switched from the open (non-conductive) to closed (conductive) position as will be explained in more detail hereinafter.

To sense the output load voltage $E_{out}$ and thus provide a basis for selection of the appropriate secondary tap of the transformer 14, the output voltage between $L1_{out}$ at 50 and the $N_{out}$ signal lead is connected across a primary winding 62 of a transformer 64. The transformer 64 includes a secondary winding 66 connected to a window detector stage 68. The window detector stage 68 operates as an analog comparator to compare the absolute value of the voltage across 66 to preset upper and lower limits. If the sensed voltage at 66 is between the predetermined upper and lower limits, the output 70 of the window detector 68 is a logic zero level. The output 70 is provided at the output of a two input OR gate 72. The two inputs to the OR gate 72 are connected respectively to the high and low outputs 74 and 76 of the window detector stage 68. If the sensed voltage is outside the preset limits the output at 70 is a logic one level.

The tap switching line voltage regulator 10 also includes a power-on reset stage 80 which on initial power rise provides at 82 a logic pulse to preset an up/down counter stage 84. The transformer 14 also includes a center tap low voltage winding 86 that is connected to a zero voltage detector and power supply stage 88. The zero voltage detector and power supply stage 88 provides a clock signal at 90 coincident with the zero crossings of the sample input voltage from the winding 86. Further the stage 88 also supplies suitable operating voltages to the various circuitry of the tap switching line voltage regulator 10.

The output 70 of the window detector stage 68 and the clock signal 90 are connected to the respective inputs of a two input AND gate 92. The output 94 of the AND gate 92 is connected to the clock input of the up/down counter 84. The up/down counter 84 includes preset inputs J1, J2, J3 and J4 which in the example illustrated in FIG. 1 includes J3 and J4 connected to ground at 96, J2 being open and J1 being selectively connected by a jumper wire 98 to ground potential at 96. The up/down counter 84 also includes an up/down control line U/D connected to the low output 76 of the window detector stage 68. Further the up/down counter 84 includes a count inhibit line connected at 100 to the inhibit output of a logic gate array at the outputs of a two input OR gate 102. Each input of the OR gate 102 is connected to the output of a respective two input AND gate 104 and 106. One input to the AND gate 104 is connected to the low output 76 of the window detector stage 68. The second input to the AND gate 104 is connected to a boost stop line 108. One input of the AND gate 106 is connected to the high output 74 of the window detector stage 68. The second input to the AND gate 106 is connected to a buck stop line 110.

The binary outputs Q1, Q2, Q3 and Q4 of the up/down counter stage 84 are connected respectively to the A, B, C, and D inputs of a binary to decade decoder stage 112. The binary to decade decoder stage includes outputs 0, 1, 2, 3, 4 and 5 connected respectively to the inputs of respective inverter gates 114, 116, 118, 120, 122, and 124. The outputs of the inverter gates 114, 116, 118 and 122 are connected to a respective one of the control leads 60, 58, 56 and 54 of the solid state switching devices for appropriate control thereof in accordance with the number of secondary taps and solid state switching devices.

For example, in the arrangement of FIG. 1 with five secondary taps, five inductors and five solid state switching devices, the control lead 54 of the solid state switching device 40 is connected to the output of the inverter gate 122. Similarly, the control leads 56, 58 and 60 of the respective solid state switching devices, 42, 44, and 46 are connected to the output of the inverter gates 118 and 116 and 114 respectively. To implement a five secondary tap line embodiment including the tap 28, the output of the inverter gate 120 is connected to a solid state switching device not shown located between the solid state switching devices 40 and 42.

The zero output of the decoder stage 112 is connected to the buck stop line 110. Further, the boost stop 108 is selectively connectable by a jumper wire 130 to one of the 2, 3, 4, 5, binary outputs of decoder stage 112 in accordance with the number of secondary tap lines in the particular arrangement. For example in the arrangement of FIG. 1 with N equal to 5, where N is the number of tapped secondary lines, the jumper 130 is selectively connected to connect the boost stop line 108 to the 4 output of the decoder 112.

The control function provided by the control circuitry of the tap switching line voltage regulator 10 for proper system operation is sequential selection of adjacent taps. Sequential selection is maintained under circuit control from the highest to lowest tap that is from 20 to 26 by incrementing through each intermediate step with no missing steps. The initial tap selection for power turn-on is preselected by having a presettable state of the up/down counter 84 and the power-on reset stage 80. The arrangement of the counter 84 and the decoder 112 ensures that only one control signal to the control inputs 54, 56, 58 and 60 of the solid state switching devices 40, 42, and 44 and 46 respectively will be turned on or actuated at any one time.

However, the fact that only one control signal to a solid state switching device is on at one time does not necessarily protect adjacent solid state switching devices during switching cycles since the current and voltage relationships are in phase for resistive loads only. The additional requirements for protection of the solid state switching devices is a current limiting impedance during partial half cycle conduction of two adjacent solid state switching devices, for example 42, 44. If resistive current limiting impedances are used, operation is very inefficient during normal operation.

In accordance with important aspects of the present invention, the protection circuit 12 provides an inductor in series with each of the solid state switching devices in each secondary tap line with each of the inductors being provided as a winding on a single common core; the directions of the windings and circuit connections being arranged such that the flux in the core will aid during any overlap conduction period and increase the loop impedance to four times the impedance of a single inductor. The design of the inductors for example, 30, 32 and 34 and 36 on the common core 38 by the proper gaping of the core and the number of turns is such that the operation is linear during the overlap period to limit the circulating current to a safe value within the surge rating of the particular solid state switching device utilized. The phasing of the inductors is always flux aiding for circulating currents and alternating in polarity for adjacent switch taps as shown in FIG. 1.

Considering operation of the tap switching line voltage regulator circuit 10 in more detail, when power from the input to winding 16 is applied, the power reset circuit 80 sends a logic pulse at 82 to the up/down counter 84 to set the output to the preset condition such that the decoder 112 decodes the preset condition as a predetermined selected tap switch. For example in the arrangement of FIG. 1, the preset condition is the output state 3 of the decoder 112 which selects the middle tap 22 and thus turns on solid state switching device 42.

At the next occuring zero crossing of the input sinewave, the solid state switching device 42 turns on and supplies voltage to the load and also the output voltage sensing circuit through winding 62 and transformer 64. The window detector stage 68 determines if the present value of the load voltage is within the predetermined upper and lower limits. If the output level is within the desired range, the output of the window detector 68 at 70 is a logic zero level and no action is required.

If the present value of sensed output voltage is not correct and is not within the sensed window limits, the window detector stage 68 at 70 will output a logic one level. The logic one at 70 "anded" with the clock pulse at 90 generates a clock pulse signal at 94 to increment the counter 84 to the next binary state in accordance with the status of the up/down line 76 and the inhibit line 100. If the sensed output voltage is low then the up/down status line and the low output 76 will be a high logic level. Correspondingly if the output voltage is high then the up/down line at the low output 76 will be a low level and the high output 74 will be a logic one level.

In response to the changed state of the counter outputs Q1-Q4, the decoder 112 changes state to remove the control signal from the currently actuated solid state switching device and to provide a control signal to an adjacent switching device. For example, if initialization with power turn-on is arranged to activate the solid state switching device 42 via the on control line 56, the solid state switching device 42 turns off the next time the current through the device 42 goes to zero. At the same time, the decoder 112 changes from one binary code to the next binary code, for example from binary output two to binary output one if the sensed output voltage level was high. Correspondingly, the solid state switching device 44 via the control line 58 would be turned on.

If the load current had been leading the voltage (i.e. a capacitive load), the two solid state switching devices 42 and 44 would both be on and conducting for almost one half cycle of input sinewave. In accordance with the protection circuit 12, the current limiting impedance provided by inductors 32 and 34 limit the circulating current to a safe value. For example when switching from device 42 to 44 and with both switching devices on, the potential between secondary taps 22 and 24 results in a circulating current that is limited only by the impedance of the inductors 32 and 34, the voltage drops across the switching elements 42 and 44 and any internal resistance in the circuit.

Upon the regulator 10 switching from one secondary tap to another via the solid state switching devices, assume that the new resulting output voltage is within the predetermined limits. Then the window detector stage 68 would provide a logic zero at 70 and the clocking action at the counter 84 would stop. However, if the sensed output voltage is still outside of the limits of the window detector 68, at the next zero voltage crossing another clock pulse at 94 will be generated to increment the counter 84. The counter will again increment according to the status of the up/cown line and the inhibit line. If the counter 84 was advanced to the physical limits of the system as determined by the total number of tap positions available, then the boost stop signal at 108 or the buck stop signal at 110 generates an inhibit signal at 100 to stop the counter 84 from incrementing in the same direction for any additional clock pulses.

The control action of the control circuitry of the regulator 10 continues until the sensed voltage is within the predetermined limits. Further, the control action is initiated any time the input line voltage changes substantially so that the sensed voltage is outside the window limits.

The solid state switching devices such as 40 are implemented by component package, solid state relays that are either zero voltage switching or non-zero voltage switching type devices. These devices can be triac type thyristors or back to back SCR type thyristors. Either type of switch can be designed to control via a low voltage AC or DC voltage. The arrangement in FIG. 1 illustrates DC type control switches.

Figure 2B:
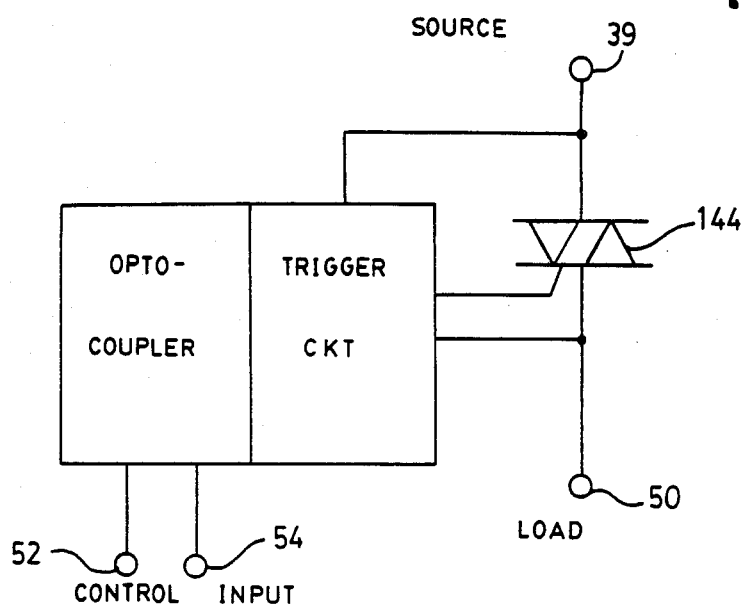
FIG. 2 illustrates two solid state switching device configurations for use as the series switching elements in the circuit of FIG. 1 with FIG. 2a illustrating a back to back SCR configuration and FIG. 2b illustrating a triac configuration FIG. 3. illustrates alternate circuit connections for the tap switching line voltage regulator of FIG. 1 with FIG. 3a illustrating tap switching in the primary side of an input transformer and FIG. 3b additionally illustrating a common neutral connection with step up and step down connections.
Figure 2A:
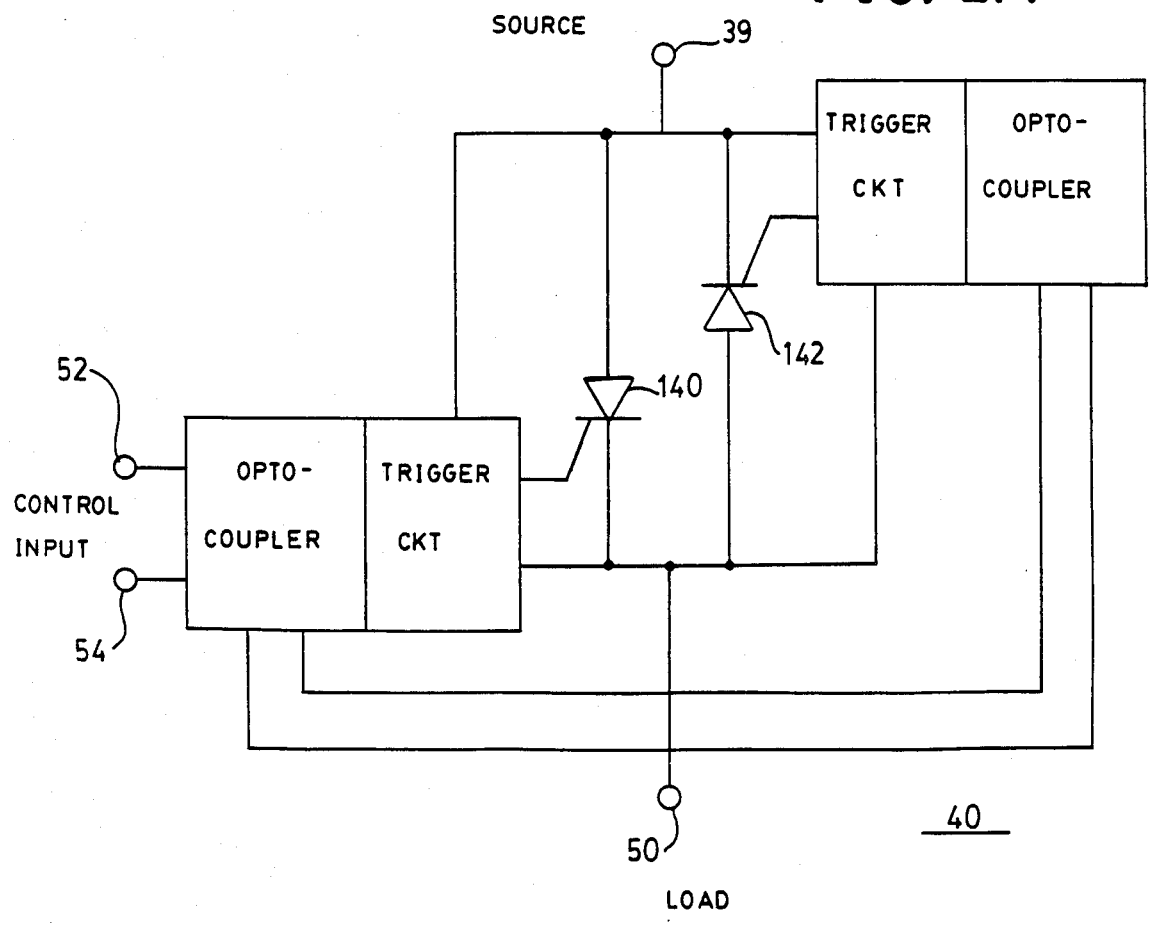

Referring now to FIG. 2, the solid state switching devices such as 40 are implemented in other arrangements from discrete devices. For example in FIG. 2a, two SCRs 140 and 142 are connected with appropriate trigger circuits and opto coupler circuits for operation in the circuit of FIG. 1. In FIG. 2b, a triac 144 is utilized with an opto-coupler circuit and trigger circuit for use as the solid state switching device 40 of FIG. 1.

Figure 3A:
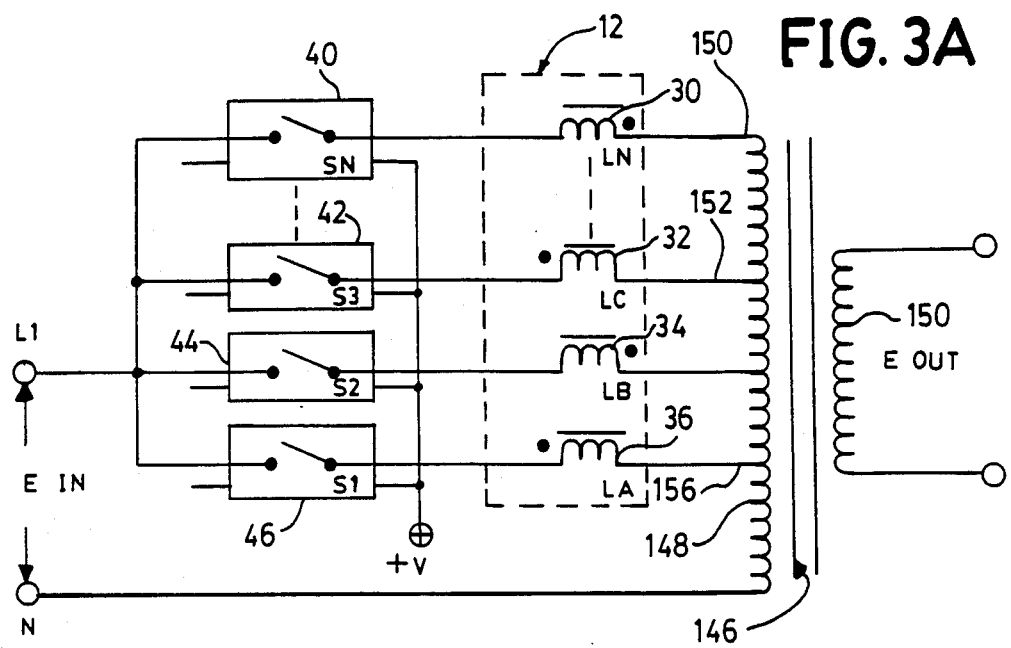

Referring now to FIG. 3, the protection circuit 12 of FIG. 1 is also useful in tap switching line voltage regulator arrangements in addition to the configuration shown in FIG. 1; the arrangement of FIG. 1 utilizes a transformer 14 with primary input and tapped secondary outputs. Referring to FIG. 3a, a transformer 146 includes a tapped primary winding 148 and a secondary output winding 150 across which the output voltage is developed. In this arrangement the L1 live lead is connected in common to one side of the main conduction path of each of the solid state switching devices such as 40, 42, 44,46 etc. Similarly to FIG. 1 each of the solid state switching devices is connected in series with respective current limiting inductors to a respective winding tap of the primary winding 148. For example, the solid state switching device 40 is connected in series with an inductor 30 to the full tap line 150 of the transformer 148. Correspondingly, the solid state switching devices 42, 44 and 46 are respectively connected through one of the inductors 32, 34 or 36 to a respective winding tap 152, 154, or 156.

Figure 3B:
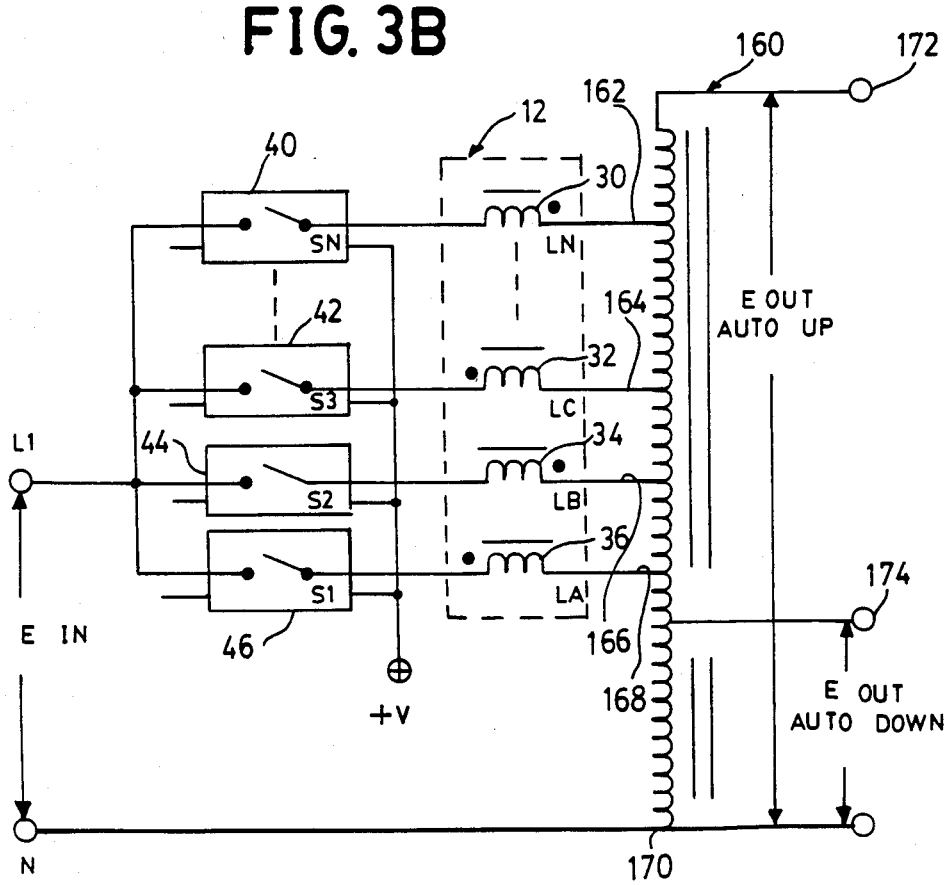

Referring now to FIG. 3b, a winding 160 is provided with input taps 162, 164, 166 and 168 that are respectively connected through an inductor the main conduction path of and a solid state switching device to the input live lead L1. The opposite end 170 of the winding 160 is connected to the neutral leads. In this arrangement an output at a full tap winding point 172 provides an auto transformer step-up circuit. Further an output at 174 provides an auto-transformer step down configuration.

For implementation of the tap switch line voltage regulator 10 of FIG. 1, the following logic circuits are illustrative of one specific embodiment which is given by way of example and not to be interpreted in any limiting sense:

| FUNCTION | CD4000 | LS7400 |
|---|---|---|
| DECODER 112 | CD4028 | 74LS42 |
| UP/DOWN 84 | CD4029 | 74LS191 |
| INVERTER 114 | CD4049 | 74LS07 |
| "OR" 72,102 | CD4071 | 74LS32 |
| "AND" 92, 104, 106 | CD4081 | 74LS08 |

While there has been illustrated and described various embodiments of the present invention, it will be apparent that various changes and modifications thereof will occur to those skilled in the art. It is intended in the appended claims to cover all such changes and modifications as will fall within the true spirit and scope of the present invention.

What is claimed as new and desired to be secured by Letters Patent of the United States is:

1. In a circuit for switching a common point from one AC power line to another AC power line of a plurality of at least three AC power lines that are of the same phase but at differing voltage potentials, solid state switching device means being coupled in series with each of said AC power lines and said common point, each of said solid state switching device means including a control connection responsive to a control signal for selectively actuating said solid state switching device means to provide a single conduction path, and a current limiting inductor connected in series with each of said solid state switching means and connected in series with a respective one of each of said AC power lines, said inductors being wound on a common core and in a common winding sense to a circulating current between each adjacent pair of said AC power lines.

2. A protection circuit for a tap switching line voltage regulator that includes a plurality of at least three tap lines of the same phase but at differing AC voltage potentials, a solid state switching device connected in series with each of said tap lines having a single conduction path controlled via a control input, and a common supply point commonly connecting one side of each of said conduction paths of said solid state switching devices, said protection circuit comprising a plurality of current limiting inductors, one of said inductors being connected in series with each of said solid state switching devices and connected in series with each of said tap lines, said inductors being wound on a common core and connected in circuit such that the winding sense is opposite for said inductors corresponding to said tap lines that are immediately adjacent in terms of AC voltage potentials.

3. Tap switching line voltage regulator apparatus comprising;
an AC supply input;
a transformer responsive to said AC supply input and including a winding having a predetermined plurality of winding taps;
a plurality of solid state switch devices, one of said solid state switch devices being coupled in series with a respective one of each of said winding taps, each of said solid state switching devices having a controlled conduction path and a control input for controlling the state of said controlled conduction path, one side of each of said controlled conduction paths being connected to a common load point;
means for sensing an output voltage determined by said solid state switch devices and said winding taps and for controlling the state of said solid state switch devices by generating a control signal to one of said control inputs of said solid state switch devices in accordance with the sensed voltage to provide an output voltage within a desired range; and
protection circuit means for providing a current limiting impedance to circulating currents between two winding taps corresponding to a first one of said solid state switch devices that is currently being controlled to conduct and a second one of said solid state switch devices that was being controlled to conduct just preceeding said first solid state switch device, said protection circuit means providing an impedance to circulating currents which flow when both said first and second switch devices are conducting that is approximately equal to four times the impedance provided to normal load current flowing only in one of said first or second solid state switch devices, said protection circuit means located in said controlled conduction path between each of said solid state switching devices and said respective one of each of said winding taps.

4. The apparatus of claim 3 wherein said protection circuit means comprises a plurality of inductors, one of said inductors being connected in series with the controlled conduction path of each of said solid state switch devices, said inductors all being magnetically coupled by a common core and being wound and connected in circuit to provide aiding flux in the core due to circulating currents between any two winding taps that are adjacent in terms of AC voltage potentials.

5. The apparatus of claim 4 wherein said means for voltage sensing and for controlling the state of said solid state switch devices comprises means for actuating adjacent solid state switch devices corresponding to adjacent AC voltage potentials when changing the state of said controlled solid state switch device that is currently controlled to provide the controlled conduction path.

6. The apparatus of claim 3 wherein said transformer includes a primary winding connected to said AC supply input and a tapped secondary winding, said common point being the output of said apparatus.

7. The apparatus of claim 3 wherein said transformer includes a tapped primary winding, said common point being connected to said AC supply input, said transformer further including a secondary winding providing the output of said apparatus.

8. The apparatus of claim 4 wherein said inductors and said core are arranged to provide linear operation to said circulating currents.

9. The apparatus of claim 4 wherein the inductance of each of said inductors is determined to limit said circulating current within the surge rating of said solid state switch devices.

* * * * *